United States Patent Office 3,264,073
Patented August 2, 1966

3,264,073
NOVEL METAL MICROSPHERES AND
THEIR MANUFACTURE
Charles R. Schmitt, Oak Ridge, Tenn., assignor to the United States of America as represented by the United States Atomic Energy Commission
No Drawing. Filed June 9, 1965, Ser. No. 462,766
7 Claims. (Cl. 29—182)

This invention relates generally to low-density materials and more specifically to metal microspheres and their manufacture.

Micro-size spheres (<200 microns in diameter) of plastic and/or glass, commonly referred to as "microballons," have heretofore been commercially available and at least two patents, namely, U.S. Patents 2,797,201 and 2,978,339, are known which disclose methods for fabricating these microballoons. Such articles of manufacture have many commercial applications such as, for example, in the fabrication of low-density foam. There, the phenolic or glass microballoons are bonded with a resin and formed into a structural material, the microballoons providing the cellular structure. Also, these microballoons are useful as structural materials in the aircraft industry. The use of microballoons in these applications is advantageous over the chemical foam materials in that the microballoons form cells of a selected size and strength as contrasted with the unpredictable strength and cell size of chemical foams. While the phenolic and glass microballoons have high utility in certain applications, they are limited in their ultimate use due to their relative low strength and low melting point. Thus, it is desirable to provide microballoons which have high strength properties and are suitable for high temperature application.

It is therefore a primary object of this invention to provide novel metal microspheres and a method for preparing same.

Another object is to provide a method for preparing metal microspheres which have greater strength and increased resistivity to heat than prior art phenolic or glass microspheres.

Still another object is to provide a method for preparing unitary, hollow metal microspheres which are readily adapted for fabrication in a lightweight structural member.

A further object is to provide a method for preparing a low density, light-weight metal structure incorporating microspheres of the character herein described.

A still further object is to provide a method for preparing tungsten microspheres having an average diameter of from 60–800 microns.

These and other objects which will be apparent to those skilled in the art are provided by heating phenolic microballoons under an inert atmosphere to coke the microballoons to form carbon microspheres, applying a metal coating to said carbon microspheres, and thereafter removing the carbon, leaving metallic microspheres. Metal microspheres having a uniform wall thickness of approximately two microns and an average particle size between 80 and 800 microns have been prepared by the present method. In its broad aspect, the scope of the invention includes the incorporation of these metal microspheres into low density, high strength cellular metal structures. For example, tungsten metal microspheres have been fabricated into low density tungsten structures by (1) precoating the tungsten microspheres with tungsten metal powder and sintering (without pressure) into a bonded structure or (2) bonding the microspheres to each other by pressureless sintering techniques. Typical tungsten structures prepared from tungsten microspheres had sintered densities ranging from 1.9 to 4.2 grams/cc. Such metal structures have resulted in several highly advantageous and heretofore unobtainable achievements, namely, low density, high strength metal structures having controlled porosity as well as controlled density.

While the composition of the phenolic microballoons may vary widely, it is preferred that they (1) have a high coking yield, preferably above 50 percent, and (2) be readily volatilized at elevated temperatures employed herein with maximum carboneous residue. Thermo-setting resins, such as phenol-formaldehyde, epoxy, and furans, have a high coking yield and accordingly are preferred. Moreover, thermo-setting resins such as phenolic microballoons carbonized at relatively low temperatures upon coking, and maintained their original sphericity up to temperatures at which the metal is deposited on the coked microspheres.

In an initial step of this process the phenolic microballoons are heated to an elevated temperature to carbonize the microballoons. This carbonization temperature may vary, depending upon the composition of the microballoons, but should preferably be at least 900° C. The pyrolysis is best carried out in an inert atmosphere such as flowing argon and, where pyrolyzed at 900° C. in argon, a dwell time of about one-half hour at this temperature has been found sufficient to effect a coking of the phenolic microballoons. A slow heating cycle of 48 or 72 hours is desirable to prevent particle warpage.

After the phenolic microballoons are cooked, a metal layer is deposited on the resulting microspheres. It should be noted here that the coked microspheres after carbonization at 900° C. exhibited a high tendency to absorb moisture from the atmosphere. Depending on relative humidity conditions, moisture pickup was found to be as high as about 14% by weight. The microspheres, however, can readily be dried in an oven at 110° C. without any apparent damage and preferably the carbonized microspheres should be handled in a dry atmosphere. The coked microspheres may also be stabilized with regard to moisture pickup by re-heating in an inert atmosphere such as argon to temperatures as high as 2500° C. in order to graphitize the carbon. A thin layer of metal is next caused to be deposited on the coked microspheres. For this, any conventional metal deposition technique may be employed and where, for example, tungsten metal microspheres are contemplated, a hydrogen reduction vapor deposition process employing a tungsten metal halide gaseous reactant is preferred. Tungsten coatings of a uniform thickness of approximately two microns have been effected by tungsten hexafluoride vapor deposition (in hydrogen) at temperatures between 550° to 720° C.

To produce metal microspheres the metal coated carbonized microspheres are subsequently heated to a moderately high temperature to remove the carbon by vaporization. Temperatures of at least 1350° C. have been found satisfactory as where, for example, tungsten metal microspheres are produced. In carrying out this carbon removal operation the metal coated microspheres should preferably be heated in a hydrogen atmosphere, and heating periods of about 3 hours have been quite suitable in removing essentially all of the carbon. The exact mechanism by which the carbon is removed upon vaporization from the interior of the metal microspheres is not completely understood. It is thought that the hydrogen employed during this heating operation diffuses into the metal microspheres and there reacts with the vaporized carbon to form methane which may diffuse out or is trapped within the metal pores of the metal microspheres. In any event photomicrographs of the metal microspheres taken before and after heating to vaporize the carbon, show that the carbon shell which is present before heating is completely removed by the heating operation.

Fabrication of such metal microspheres into bonded metal structures may be effected by encapsulating the metal microspheres in a like metal powder. Where, for example, a low density, high strength tungsten metal structure is contemplated, sinterable tungsten powder is pre-coated by any convenient method, such as by tumbling, and sintered (without pressure) under a hydrogen atmosphere for a period of time sufficient to produce a bonded compact. Alternately, low density, high-strength tungsten metal structures may be prepared by pressureless sintering the tungsten microspheres together to form tungsten metal articles composed of microspheres alone.

Further illustration of the quantitative aspects and procedures of the present invention is provided in the following examples. Example I describes the basic procedure and technique used in preparing tungsten metal microspheres and Example II illustrates a method for preparing a low density, high-strength tungsten metal article.

EXAMPLE I

Approximately forty grams of phenol-formaldehyde microballoons, having an average helium density of 1.25 grams/cc. and a particle size range from 60 to 800 microns diameter, was pyrolyzed in a quartz boat at 900° C. for one-half hour under flowing argon. After this carbonization the microballoons were found to retain their physical integrity, including their original sphericity and, although some of the particles were loosely bonded together, they could be separated easily. The microballoons gave a coking yield of approximately 55% at 900° C. The tapped, settled, and bulk density of the carbonized microballoons was 0.15 gram/cc.

Due to the relatively hygroscopic properties of the coked microspheres they were handled in a dry atmosphere and, where exposed to moisture, were readily dried in an oven at 110° C. without adversely affecting the integrity or sphericity of the microspheres.

After carbonization, the coked microspheres were next coated with a layer of tungsten metal. A hydrogen reduction, vapor deposition process was employed as follows: Tungsten hexafluoride and hydrogen gas at a total flow rate of approximately 100 ml./min. was passed over the coked microspheres at a temperature between 550°–720° C. for a period of about one hour. This resulted in a highly uniform coating of tungsten of approximately two microns thick being deposited on the coked microspheres.

The metal coated microspheres were then heated to a temperature of 1500° C. to vaporize the carbon present and produce hole-free, hollow, unitary tungsten microspheres. This vaporization operation was carried out in flowing hydrogen (15 ml./sec.) for 3 hours and resulted in essentially 100% of the carbon being vaporized. X-ray diffraction analysis of the resulting tungsten microspheres showed only the presence of tungsten with no metal carbide, i.e., tungsten carbide being detected.

EXAMPLE II

Approximately 20 grams of the hollow tungsten microspheres in Example I were fabricated into various shaped low density, high-strength tungsten structures. Approximately 25 to 50% by volume of a high sinterable tungsten powder, having a sub-micron average particle size range, a surface area of 4.96 m.$^2$/g., and oxygen content of 3.33%, was applied by tumbling in a glass container to the hollow tungsten microspheres. The resulting aggregates were placed in a ceramic mold, tapped to achieve the maximum particle packing of the particles, and sintered (without pressure) under flowing hydrogen (15 ml./sec.) for two hours at 1500° C. The resulting shaped bodies, though fragile, were strong enough to withstand normal handling. The properties of the resulting tungsten articles are shown in the table below.

*Table*

| Specimen No. | 1 | 2 | 3 | 4 | 5 |
|---|---|---|---|---|---|
| Microballoons (vol. percent) | 75 | 75 | 50 | 75 | 50 |
| Tungsten powder [1] (vol. percent) | 25 | 25 | 50 | 25 | 50 |
| Sintered density (g./cc.) | 1.9 | 2.2 | 3.5 | 2.7 | 4.2 |
| Sintered density (percent of theor.) | 9.6 | 11.2 | 18.8 | 13.8 | 21.7 |

[1] Volume percent is only an estimate.

Although the present invention has been described in connection with specific examples, these are to be construed as illustrative rather than limitations in this invention. For example, the phenolformaldehyde and/or epoxy or furane microballoons may be replaced by similar materials well known to those skilled in the art, and other conventional techniques for disposing a thin layer of metal on a selected substrate may be substituted for the specific method of vapor deposition by hydrogen reduction or tungsten hexafluoride. Thus, those skilled in the art will readily understand the variations and modifications of the present invention and interpret the scope of the invention only as being limited by the appended claims.

What is claimed is:

1. A method for preparing unitary, hollow, metal microspheres comprising the steps of heating phenolic microballoons under an inert atmosphere to a temperature sufficient to coke said microballoons thereby forming carbon microspheres, applying a metal coating to said carbon microspheres and thereafter removing the carbon to form metal microspheres.

2. The method of claim 1 wherein said coking step is carried out at a temperature of at least 900° C. under flowing argon, said metal coating is tungsten metal and said carbon is removed by treatment with hydrogen at a temperature of at least 1350° C.

3. The method of claim 2 wherein said tungsten metal coating is disposed thereon said carbon microspheres by vapor deposition of tungsten hexafluoride by hydrogen reduction at a temperature of about 700° C.

4. The method of claim 1 wherein said phenolic microballoons comprised same selected from the group consisting of phenol-formaldehyde and epoxy resin.

5. A method for preparing low density, high strength metal structure comprising the steps of coking phenolic microballoons to form carbon microspheres, applying a metal coating to said carbon microspheres, removing said carbon to produce unitary, hollow, metal microspheres, pre-coating said formed metal microspheres with a like metal powder, and thereafter pressureless sintering said aggregate to thereby produce said metal structure.

6. The method of claim 5 wherein said metal coating is tungsten, said like metal powder is tungsten powder and said sintering is carried out under flowing hydrogen at a temperature of about 1500° C.

7. A low density, high strength, tungsten cellular structure comprising bonded tungsten metal microspheres, said structure having a sintered density of between 1.9 and 4.2 grams/cc.

References Cited by the Examiner

UNITED STATES PATENTS 3,052,967 9/1962 Fischer _____ 29—182
3,078,552 2/1963 Grandy _____ 29—182

OTHER REFERENCES

Chemical Engineering, Aug. 19, 1963, pp. 92–94.
Nuclear Science Abstracts, vol. 16, No. 3, Feb. 15, 1962, p. 426, Abstract No. 3481.

BENJAMIN R. PADGETT, *Acting Primary Examiner.*

M. J. SCOLNICK, *Assistant Examiner.*